(12) United States Patent
Neville

(10) Patent No.: US 10,913,429 B1
(45) Date of Patent: Feb. 9, 2021

(54) APPARATUS FOR CLEARING SNOW AND ICE ON A WINDSHIELD OR A WINDOWPANE OR A SIDE MIRROR OF A VEHICLE

(71) Applicant: James Neville, Arvada, CO (US)

(72) Inventor: James Neville, Arvada, CO (US)

( * ) Notice: Subject to any disclaimer, the term of this patent is extended or adjusted under 35 U.S.C. 154(b) by 210 days.

(21) Appl. No.: 16/047,352

(22) Filed: Jul. 27, 2018

(51) Int. Cl.
  *H05B 1/02* (2006.01)
  *B60S 1/02* (2006.01)
  *H05B 3/84* (2006.01)
  *B60S 3/04* (2006.01)

(52) U.S. Cl.
  CPC .............. *B60S 1/026* (2013.01); *B60S 3/04* (2013.01); *H05B 3/84* (2013.01)

(58) Field of Classification Search
  CPC .......... B60S 1/026; B60S 3/04; B60S 3/0042; B60S 3/36; B60S 3/28; B60S 2203/013; H05B 1/02; H05B 2214/02
  USPC ........ 219/202, 203, 494, 497, 528, 544, 549
  See application file for complete search history.

(56) References Cited

U.S. PATENT DOCUMENTS

| | | | | |
|---|---|---|---|---|
| 3,546,432 A * | 12/1970 | Eisler | ............... | F24D 13/024 |
| | | | | 392/436 |
| 3,757,087 A * | 9/1973 | Bernard | ............... | H01R 4/02 |
| | | | | 219/549 |
| 6,184,496 B1 * | 2/2001 | Pearce | ............... | E01C 11/265 |
| | | | | 219/202 |
| 6,316,746 B1 * | 11/2001 | Golston | ............... | H05B 3/845 |
| | | | | 219/219 |
| 6,353,707 B1 * | 3/2002 | Loktev | ............... | H05B 3/26 |
| | | | | 219/213 |
| 7,431,375 B1 | 10/2008 | Julius | | |
| 8,362,399 B2 * | 1/2013 | Seaborn | ............... | H05B 3/84 |
| | | | | 219/202 |
| 8,378,262 B2 * | 2/2013 | Wei | ............... | H05B 3/84 |
| | | | | 219/203 |
| 8,399,805 B2 * | 3/2013 | Biddell | ............... | A42B 3/245 |
| | | | | 219/203 |
| 9,271,335 B1 * | 2/2016 | Lamb | ............... | H05B 3/34 |
| 2008/0203078 A1 * | 8/2008 | Huerter | ............... | B60S 1/026 |
| | | | | 219/203 |
| 2009/0101632 A1 * | 4/2009 | Naylor | ............... | E01C 11/265 |
| | | | | 219/202 |
| 2012/0193338 A1 * | 8/2012 | Sullivan | ............... | H05B 3/56 |
| | | | | 219/202 |

* cited by examiner

*Primary Examiner* — Mark H Paschall
(74) *Attorney, Agent, or Firm* — Sanchelima & Associates, P.A.; Christian Sanchelima; Jesus Sanchelima

(57) ABSTRACT

An apparatus for clearing snow and ice is disclosed. The apparatus is provided at a windowpane or a side mirror or a windshield of a vehicle. The apparatus comprises a first layer and a second layer. The first layer or the second layer is removably coupled to the windowpane or the side mirror or the windshield. The apparatus comprises a heating element provided in between the first layer and the second layer. The apparatus further comprises a plug coupled to the heating element via a cable. Further, the plug is coupled to a receptacle provided at a dashboard of the vehicle. The plug inserted in the receptacle to introduce electricity into the heating element to increase the temperature of the heating element to clear the snow or ice formed on the windowpane or the side mirror or the windshield.

9 Claims, 3 Drawing Sheets

APPARATUS FOR CLEARING SNOW AND ICE ON A WINDSHIELD OR A WINDOWPANE OR A SIDE MIRROR OF A VEHICLE

FIELD OF THE INVENTION

The present disclosure generally relates to vehicle covers. More specifically, the present disclosure relates to an apparatus provided at a windshield or a windowpane or a side mirror of a vehicle, the apparatus is used to clear snow and ice on the windshield or the windowpane or the side mirror.

DESCRIPTION OF THE RELATED ART

It is known that covers have been used to protect vehicles from damage caused by environmental and weather conditions such as solar radiation, heat, dust, acid rain, hail, ice, snow and flying objects, which may be encountered during severe weather. Typically, the cover is made up of canvas or nylon. The cover is provided with a means for securing the cover to the vehicle such as an elastic band extending about its periphery or hooks for attaching to the vehicle. Further, the cover is provided as a large sheet to cover windshield, roof, rear window, side windows, and side mirrors of the vehicle.

Although the cover provided in the existing art adequately protects the vehicle from severe weather conditions, most of them are not effective. This is because; it is very difficult to clear ice and snow from exterior of the vehicle, as the size of the cover is large. Further, it is difficult to fold and store the cover inside the vehicle due to its size and weight.

In order to overcome the difficulties discussed above, several attempts were made in the past. One such solution is disclosed in a U.S. Pat. No. 7,431,375. In U.S. Pat. No. 7,431,375, a cover for protecting the windshield, roof, rear window, side windows, and side view mirrors of the vehicle is disclosed. The cover is provided with thin straps to secure the cover to the vehicle.

Another example to clear snow and ice on the vehicle is disclosed in a United States patent application numbered 20140167444. In US20140167444, a cover that includes attachments extending over the length of the vehicle cover to include the hood and the trunk is disclosed. The vehicle cover is divided into two separate sections longitudinally. The two separate sections of the vehicle cover terminate with vertical barriers, which attach to each other, via loop-and-hook type fasteners or other articulating mechanisms, at several points along the medial vertical barriers. Placing the two "connected halves" of the cover over a desired vehicle allows the snow to accumulate on the cover while keeping the vehicle underneath dry. Once the snowstorm is over, each half of the snow cover is removed separately, which allows the snow and ice to drop to the ground revealing a clean vehicle.

Although the disclosures discussed above solve the problem of clearing the snow and ice, they too have a common problem as discussed earlier. The covers are too large and require huge space to store. Further, it takes considerable time to put the covers on the vehicle. If the snow or ice comes in contact with the windshield or the windowpane or the side mirrors, scratches may be formed on the windshield or the windowpane or the side mirrors. Therefore, the covers need to be put and taken off carefully.

Other documents describing the closest subject matter provide for a number of more or less complicated features that fail to solve the problem in an efficient and economical way. None of these patents suggest the novel features of the present invention. Specifically, none of the disclosures in the art disclose an apparatus provided on a windshield or a windowpane or a side window, the apparatus comprising a heating element that heats up at certain temperature to clear the ice or snow on the windshield or the windowpane or the side window.

Therefore, there is a need in the art for an apparatus comprising a heating element to clear ice and snow on a windshield or a windowpane or side mirrors or a windshield of a vehicle.

SUMMARY OF THE INVENTION

It is one of the main objects of the present invention to provide an apparatus comprising a heating element to clear snow and ice and avoids the drawbacks of the prior art.

It is one object of the present invention to provide an apparatus removably coupled to a windshield or a windowpane or side mirrors of a vehicle to clear snow and ice.

It is one object of the present invention to provide an apparatus for clearing snow and ice that can be affixed, removed from a vehicle and stored easily.

It is one object of the present invention to provide an apparatus for clearing snow and ice. The apparatus is provided at a windowpane or a side mirror or a windshield of a vehicle. The apparatus comprises a first layer and a second layer. The first layer or the second layer is removably coupled to the windowpane or the side mirror or the windshield. The apparatus comprises a heating element provided in between the first layer and the second layer. The apparatus further comprises a plug coupled to the heating element via a cable. Further, the plug is coupled to a receptacle provided at a dashboard of the vehicle. The plug inserted in the receptacle to introduce electricity into the heating element to increase the temperature of the heating element to clear the snow or ice formed on the windowpane or the side mirror or the windshield.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

The following detailed description is intended to provide example implementations to one of ordinary skill in the art, and is not intended to limit the invention to the explicit disclosure, as one or ordinary skill in the art will understand that variations can be substituted that are within the scope of the invention as described.

The present disclosure discloses an apparatus for clearing snow and ice. The apparatus is provided at a windowpane or a side mirror or a windshield of a vehicle. The apparatus comprises a first layer and a second layer. The first layer or the second layer is removably coupled to the windowpane or the side mirror or the windshield. The apparatus comprises a heating element provided in between the first layer and the second layer. The apparatus further comprises a plug coupled to the heating element via a cable. Further, the plug is coupled to a receptacle provided at a dashboard of the vehicle. The plug inserted in the receptacle to introduce electricity into the heating element to increase the temperature of the heating element to clear the snow or ice formed on the windowpane or the side mirror or the windshield.

Figure 1:
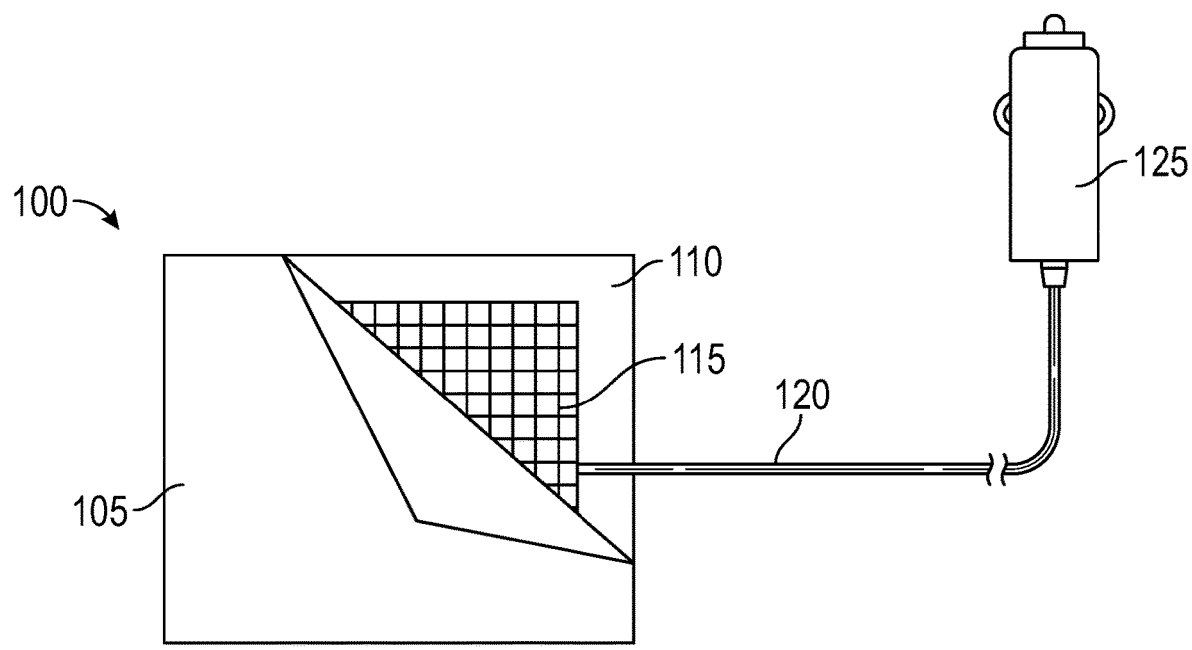
FIG. 1 illustrates a schematic diagram of an apparatus 100 for clearing snow and ice, in accordance with one embodiment of the present disclosure.
Figure 2:
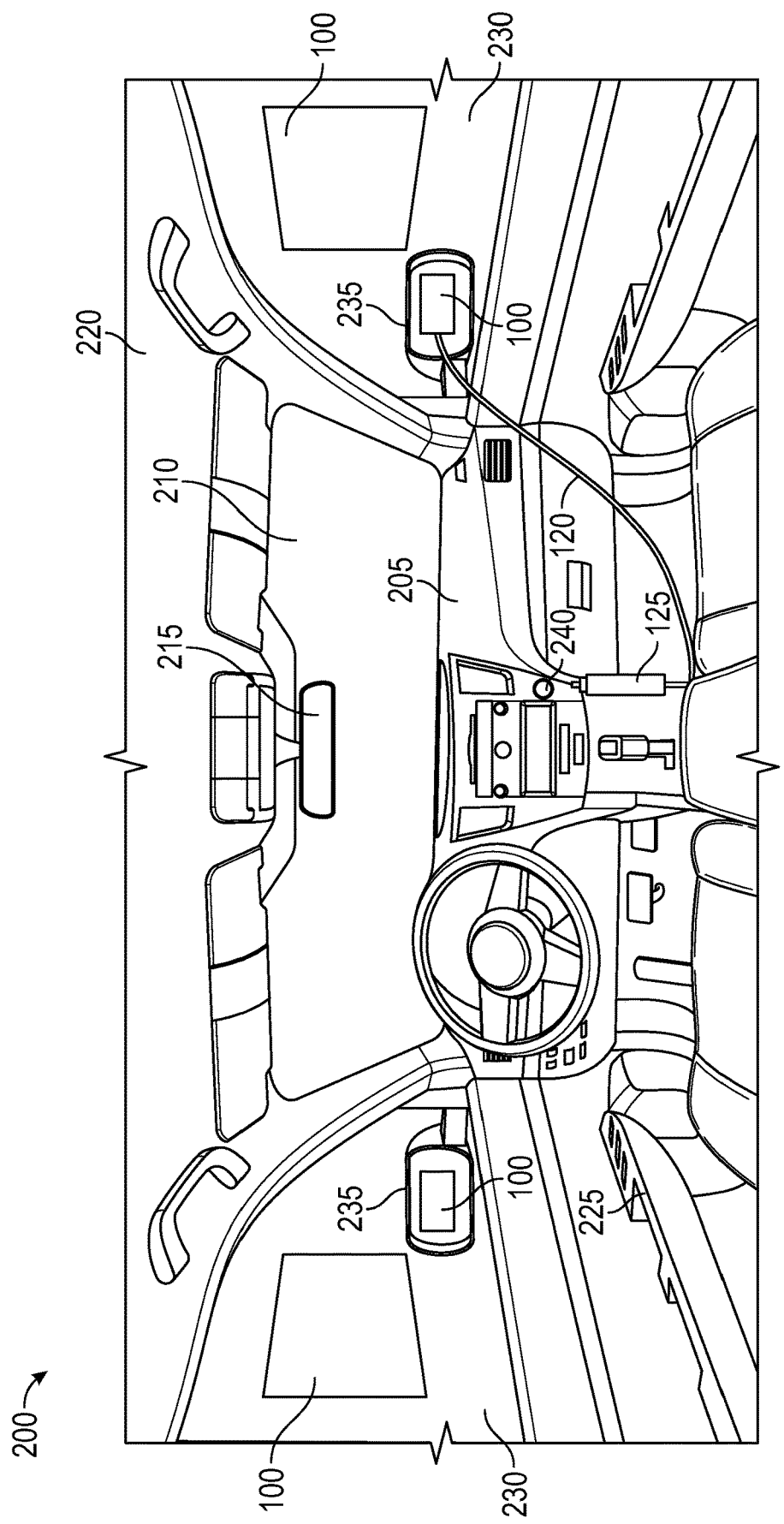
FIG. 2 illustrates the apparatus 100 coupled to a vehicle 200 for clearing snow and ice, in accordance with one embodiment of the present disclosure.
Figure 3:
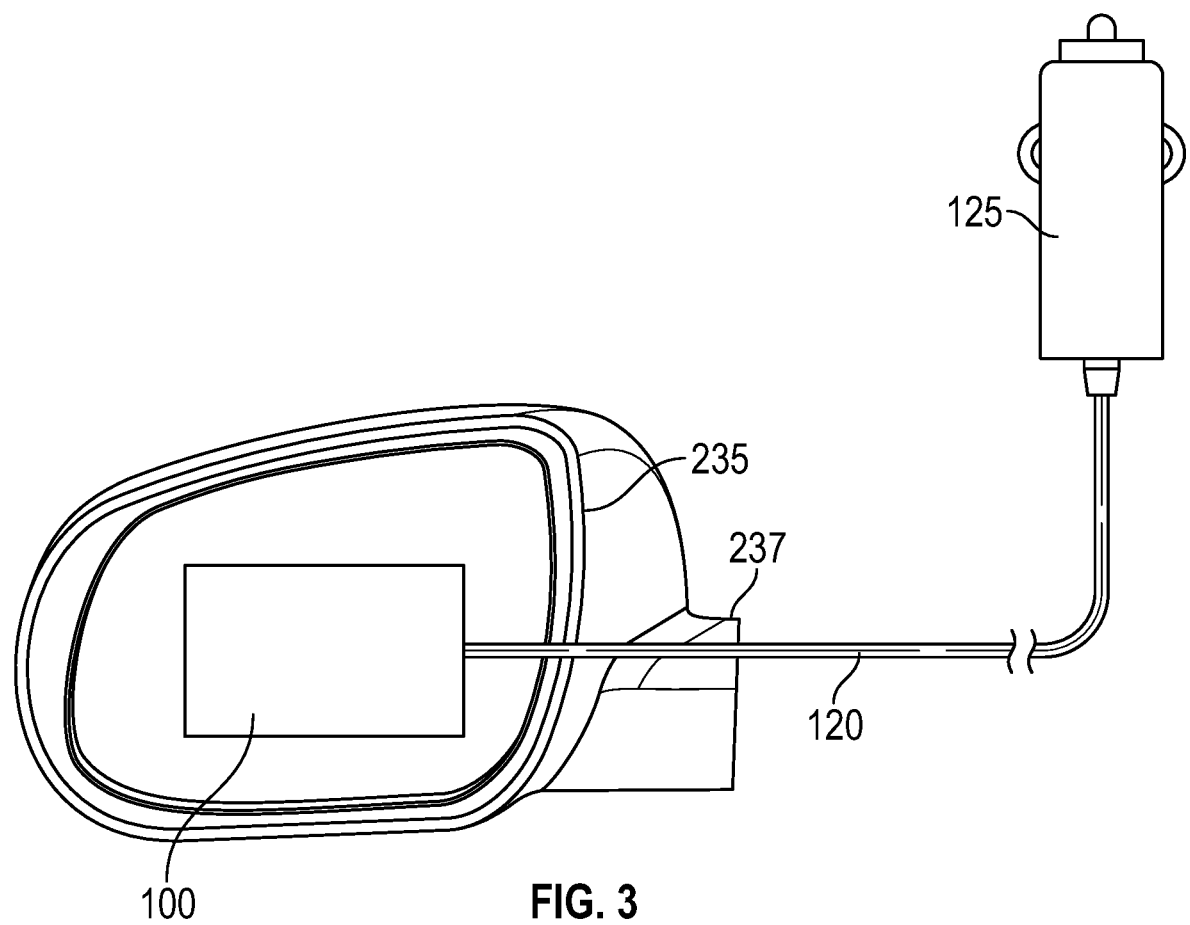
FIG. 3 illustrates the apparatus 100 coupled to a side mirror 235 of the vehicle 200, in accordance with one embodiment of the present disclosure.

Various features and embodiments of an apparatus for clearing snow and ice are explained in conjunction with the description of FIGS. 1-3.

Referring to FIG. 1, a schematic diagram of an apparatus 100 used for clearing snow and ice is shown, in accordance with one embodiment of the present disclosure. The apparatus 100 comprises a first layer 105 and a second layer 110. The first layer 105 may indicate a top layer and the second layer 110 may indicate a bottom layer, or vice versa. Each of the first layer 105 and the second layer 110 is provided in a thin-film sheet made up of fireproof material. Further, each of the first layer 105 and the second layer 110 is made up of canvas or nylon or ceramic oxide yarn or any other material that is fireproof, and thermally insulated. The first layer 105 and the second layer 110 may be provided in a transparent or translucent material.

The apparatus 100 comprises a heating element 115 provided in between the first layer 105 and the second layer 110. The heating element 115 may be provided in a form of a thin sheet or a metallic strip. The heating element 115 may be made up of nichrome comprising 20 percent chromium and 80 percent nickel. In one example, the heating element 115 may be provided in between the first layer 105 and the second layer 110 as an attachment. In another example, the heating element 115 may be placed in between the first layer 105 and the second layer 110 and the corners of the first layer 105 and the second layer 110 may be attached such that the heating element 115 is contained within the first layer 105 and the second layer 110.

The heating element 115 is coupled to a plug 125 via a cable 120. The plug 125 may be provided as a male unit used to draw power (DC Voltage) from a battery (not shown) of a vehicle 200 (as shown in FIG. 2). The plug 125 may comprise a circuitry to regulate or step down voltage received from the battery. In one example, the plug 125 may comprise DC choppers to regulate or step down the voltage received from the battery to a certain voltage and supply the voltage to the heating element 115 via the cable 120.

Referring to FIG. 2, the vehicle 200 is shown. The vehicle 200 may include, but not limited to, a car, bus, truck, train, and so on. The vehicle 200 comprises a dashboard 205 and a windshield 210. Further, the vehicle 200 further comprises a rear view mirror 215 provided at a rooftop 220 of the vehicle 200. The vehicle 200 comprises side doors 225, each having a windowpane 230. Further, the vehicle 200 comprises side mirrors 235 at both sides of the vehicle 200.

The dashboard 205 comprises a receptacle 240. The receptacle 240 may indicate a socket that can receive the plug 125. The receptacle 240 may be made up of a plastic or any other suitable material. The receptacle 240 is provided in a cylindrical portion having spring-loaded contacts of 12V, which is electrically connected to the battery (not shown) of the vehicle 200. The receptacle 240 provides electrical contact to the plug 125 with the battery when the plug 125 is inserted in the receptacle 240.

Referring to FIG. 2, the apparatus 100 provided at the side mirror 235 of the vehicle is shown, in accordance with one embodiment of the present disclosure. In order to couple the apparatus 100 to the side mirror 235, at first, the first layer 105 and the second layer 110 may be provided at the side mirror 235. In one example, the first layer 105 may be coupled to the side mirror 235 using adhesive. In another example, the first layer 105 may be removably coupled to the side mirror 235 using a clip, a fastener or any other known mechanism.

After coupling the first layer 105 to the side mirror 235, the cable 120 is drawn through a connector 237 used to couple the side mirror 235 to the vehicle 200, as shown in FIG. 3. As described above, one end of the cable 120 is coupled to the heating element 115. Further, other end of the cable 120 is coupled to the plug 125

In another embodiment, the apparatus 100 may be provided at the windowpane 230 of the side door 225. Similarly, the apparatus 100 may be provided at the windshield 210 of the vehicle 200. After connecting the apparatus 100 at the windowpane 230 and the windshield 210, the apparatus 100 may be coupled to the receptacle 240 via the cable 120 and the plug 125.

It is known that the vehicle 200 may be exposed to severe weather conditions such as snow, ice, moisture, and so on. In order to clear the snow and ice on the vehicle, the apparatus 100 can be provided at the windshield 210, or the windowpane 230 or the side mirror 235. In one example, the apparatus 100 may be provided at the windshield 210, the windowpane 230 and the side mirror 235. In order to clear the snow, moisture and ice, at first, a user of the vehicle 200 may enter the vehicle 200. The user may start or ignite an engine of the vehicle 200. Subsequently, the user may insert the plug 125 in the receptacle 240 provided at the dashboard 205 of the vehicle 200. Upon insertion, the plug 125 makes electrical contact with the receptacle 240 and completes the electric circuit with the battery of the vehicle 200. As specified above, the plug 125 comprises a circuitry to regulate or step down the voltage drawn i.e., 12V to a certain voltage e.g., 3V. As such, the plug 125 step downs the voltage and supplies 3V to the heating element 115 via the cable 120.

When the plug 125 is inserted into the receptacle 240, electricity is introduced into the heating element 115. Subsequently, the heating element 115 heats up thereby raising temperature of the heating element 115. As the heating element 115 is provided in between the first layer 105 and the second layer 110, the first layer 105 and the second layer 110 are heated up. Subsequently, the heat is transferred to the side mirror 235 from the first layer 105 as the first layer 105 is in contact with the side mirror 235.

In one example, the heating element 115 may be provided with a circuitry (not shown) to control heating of the heating element 115 up to a threshold temperature. For example, the threshold temperature may be determined as 50 degrees Celsius. In another example, the threshold temperature may be determined as 65 degrees Celsius. The threshold temperature indicates a temperature which is considered to be safe enough to melt the snow, moisture and ice at the side mirror 235 and the temperature beyond which may cause the side mirror 235 to crack. In other words, the circuitry of the heating element 115 is configured to stop heating of the heating element after reaching the threshold temperature to protect the side mirror 235 from cracking. In one embodiment, the circuitry of the heating element 115 may be configured to stop heating after a pre-defined time period. For example, the circuitry of the heating element 115 may be configured to stop heating after 2 minutes from plugging in the plug 125 in the receptacle 240. The circuitry of the heating element 115 may be configured to stop heating after the pre-defined time period in order prevent the heating element 115 from heating beyond the threshold temperature that will crack the side mirror 235.

After melting of the snow and ice at the side mirror 235, the user may remove the plug 125 from the receptacle 240. Similarly, the user may clear the snow and ice at the windowpane 230 and the windshield 210.

In one example, the apparatus 100 may be provided at the side mirror 235. After clearing the snow and ice at the side mirror 235, the apparatus 100 may be removed from the side mirror 235 and coupled to the windowpane 230 in order to clear snow and ice at the windowpane 230. Consecutively, the apparatus 100 may be removed from the windowpane 230 and coupled to the windshield 210 in order to clear snow and ice at the windshield 210. It should be understood that the apparatus 100 might be provided at each of the windshield 210, the windowpane 230 and the side mirror 235 to clear the snow and ice simultaneously.

It should be understood that the apparatus 100 might be provided in various shapes and sizes to couple to the windshield 210 or the windowpane 230 or the side mirror 235 to clear snow and ice.

In one implementation, the first layer 105, the second layer 110 and the heating element 115 may be provided as a single unit and the cable 120 may be removably coupled to the heating element 115. As such, the first layer 105, the second layer 110 and the heating element 115 may be removed and stored easily for later use. Further, the first layer 105, the second layer 110 and the heating element 115 may be removed from the side mirror 235 and coupled to the windshield 210 or the windowpane 230 to clear snow and ice.

It is evident from the above disclosure that the apparatus is small in size and it is easy to clear the snow and ice with minimum manual effort. Further, the snow and ice can be cleared while the user waits for the engine to warm up in cold weather conditions.

Although the present disclosure is explained considering that the heating element 115 is powered using the battery provided in the vehicle 200 via the receptacle 240 and the plug 125, it is obvious to a person skilled in the art to provide an auxiliary battery (not shown) that can be used to power the heating element 115 to heat and clear the snow and ice. In one example, the auxiliary battery, the first layer 105, the second layer 110 and the heating element 115 may be provided as a single unit, which can be attached to the side mirror 235 to clear snow and ice. In order to heat the heating element 115, the user of the vehicle 200 may press a button (not shown) provided on the apparatus 100 or may activate the heating element 115 via a wireless technology such as Bluetooth. In another example, the heating element 115 may be embedded in a single layer and coupled to the side mirror 235 or the windshield 210 or the windowpane 230. It should be understood that the above implementations are explained for illustrative purpose only and implementations that are obvious variants of the above disclosure fall within the scope of the present disclosure.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An apparatus for clearing snow and ice on a window or a mirror surface of a vehicle, comprising:
   a) a first layer being a top layer and a second layer being a bottom layer, wherein said first layer and said second layer are a thin-film sheet made of a fireproof material, wherein said fireproof material is one of canvas, nylon, or ceramic oxide yarn;
   b) a heating element located between said first layer and said second layer, wherein said heating element is a thin sheet or a metallic strip, wherein said heating element is made of a nichrome material, wherein said heating element is placed between said first layer and said second layer and corners of said first layer and said second layer are attached such that said heating element is contained within said first layer and said second layer; and
   c) a plug having a cable which is coupled to said heating element, wherein said plug includes a circuitry to regulate or step-down voltage received.

2. The apparatus for clearing snow and ice on a window or a mirror surface of a vehicle of claim 1 wherein said first layer and said second layer are transparent.

3. The apparatus for clearing snow and ice on a window or a mirror surface of a vehicle of claim 1 wherein said first layer and said second layer have a rectangular shape with four sharp edges.

4. The apparatus for clearing snow and ice on a window or a mirror surface of a vehicle of claim 1 wherein said nichrome material contains 20 percent chromium and 80 percent nickel.

5. The apparatus for clearing snow and ice on a window or a mirror surface of a vehicle of claim 1 wherein said plug is a male unit adapted to draw power from a battery of a vehicle.

6. The apparatus for clearing snow and ice on a window or a mirror surface of a vehicle of claim 1 wherein said plug is coupled to a dashboard of the vehicle using a receptacle.

7. The apparatus for clearing snow and ice on a window or a mirror surface of a vehicle of claim 1 wherein said heating element includes a grid pattern.

8. The apparatus for clearing snow and ice on a window or a mirror surface of a vehicle of claim 1 wherein said heating element is a rectangular shape having an area that is less than an area of said first layer and said second layer.

9. A system for an apparatus for clearing snow and ice on a window or a mirror surface of a vehicle, comprising:
   a) a vehicle having a dashboard and a windshield, wherein said vehicle further includes a rear-view mirror and a rooftop, wherein said vehicle also includes side doors each having a windowpane, said vehicle further including side mirrors located at both sides of said vehicle, said dashboard including a receptable made of a plastic material;
   b) a first layer being a top layer and a second layer being a bottom layer, wherein said first layer and said second layer are a thin-film sheet made of a fireproof material, wherein said fireproof material is one of canvas, nylon, or ceramic oxide yarn;
   c) a heating element located between said first layer and said second layer, wherein said heating element is a thin sheet or a metallic strip, wherein said heating element is made of a nichrome material, wherein said heating element is placed between said first layer and said second layer and corners of said first layer and said second layer are attached such that said heating element is contained within said first layer and said second layer to form a patch;

d) a plug having a cable which is coupled to said heating element, wherein said plug includes a circuitry to regulate or step-down voltage received; and e) wherein said patch is mounted on said side mirrors of said vehicle, wherein said patch is located entirely within a mirror portion of said side mirrors, wherein said plug is inserted within said receptable, wherein said patch is placed on said windowpane of said side doors.

* * * * *